US 7,346,079 B1

(12) United States Patent
Meyer (10) Patent No.: US 7,346,079 B1
(45) Date of Patent: Mar. 18, 2008

(54) METHODS AND STRUCTURES OF MULTI-LEVEL COMMA DETECTION AND DATA ALIGNMENT IN DATA STREAM COMMUNICATIONS

(75) Inventor: Jerome M. Meyer, Chanhassen, MN (US)

(73) Assignee: Xilinx, Inc., San Jose, CA (US)

( * ) Notice: Subject to any disclaimer, the term of this patent is extended or adjusted under 35 U.S.C. 154(b) by 849 days.

(21) Appl. No.: 10/829,037

(22) Filed: Apr. 20, 2004

(51) Int. Cl.
*H04J 3/00* (2006.01)
*H04J 3/16* (2006.01)
*H04J 3/22* (2006.01)
*H04J 3/24* (2006.01)
*H04J 3/07* (2006.01)

(52) U.S. Cl. ............... 370/476; 370/470; 370/472; 370/473; 370/506

(58) Field of Classification Search ............ 370/506, 370/535–539, 541, 470, 472, 473, 476
See application file for complete search history.

(56) References Cited

U.S. PATENT DOCUMENTS 6,560,275 B2 * 5/2003 Lecourtier et al. .......... 375/220

7,230,956 B1 * 6/2007 Ambrose et al. ........... 370/510

OTHER PUBLICATIONS

Tektronix; Document No. 2RW-11407-2; "SONET Telecommunications Standard Primer"; published by Tektronix, Inc.; 2001; available at http://www.tek.com/Measurement/App_Notes/SONET/2RW_11407_1.pdf; pp. 1-34.

* cited by examiner

*Primary Examiner*—Benny Q. Tieu
*Assistant Examiner*—Ashley L Shivers
(74) *Attorney, Agent, or Firm*—Lois D. Cartier (57) ABSTRACT

Methods and structures of performing multi-level comma detection and alignment on an unaligned data stream. Each string of N consecutive bits in the unaligned data stream is monitored for a predetermined byte value. When the predetermined byte value is located, the unaligned data stream is aligned with the predetermined byte value, producing a partially aligned data stream. A string of bytes from the partially aligned data stream is then compared with a predetermined sequence of byte values. When the predetermined sequence is located, the partially aligned data stream is aligned based on the location of the predetermined sequence within the partially aligned data stream. The invention also encompasses multi-level comma detection and alignment circuits that can perform, for example, the previously described inventive methods.

27 Claims, 7 Drawing Sheets

METHODS AND STRUCTURES OF MULTI-LEVEL COMMA DETECTION AND DATA ALIGNMENT IN DATA STREAM COMMUNICATIONS

FIELD OF THE INVENTION

The invention relates generally to data communication systems, and more particularly to the alignment of serial data streams on their receipt by data communication systems.

BACKGROUND OF THE INVENTION

Communication systems frequently transport large amounts of data between end user devices. The data is often transmitted in serial format, i.e., as a series of bits, and converted to parallel format after receipt. Communications standards have been established for conveying data within communication systems. In general, a communications standard is a formal set of rules and conventions that govern how each end user device exchanges information within the communication system and between communication systems.

One well known communications standard is known as the "Synchronous Optical NETwork" or "SONET" standard. The SONET standard is described, for example, in the "SONET Telecommunications Standard Primer" published by Tektronix, Inc. in 2001 as document No. 2RW-11407-2 and incorporated herein by reference. As of this writing, this document is also available at the Tektronix web site at the following internet address: http://www.tek.com/Measurement/App_Notes/SONET/2RW_11407_2.pdf.

SONET has many advantages as a communications standard, as it provides powerful networking capabilities. Therefore, it is desirable to provide structures and methods of facilitating data communications conforming to this standard. It is further desirable to provide structures and methods of facilitating data communications conforming to other communications standards that now or in the future prove to be useful in data communication systems.

SUMMARY OF THE INVENTION

The invention provides methods and structures of performing multi-level comma detection and alignment on a received data stream. According to one embodiment of the invention, each string of N consecutive bits in an unaligned data stream is monitored for a predetermined byte value, where N is an integer. When the predetermined byte value is located, the unaligned data stream is aligned with the preceding and following edges of the predetermined byte value, producing a partially aligned data stream. A string of bytes is then monitored for a predetermined sequence of byte values. When the predetermined sequence is located, the partially aligned data stream is aligned based on the location of the predetermined sequence within the partially aligned data stream.

In some embodiments, the string of bytes monitored for the predetermined sequence includes each string of consecutive bytes in the partially aligned data stream, and the process continues at least until a first match is found. In other embodiments, the process of locating the predetermined byte value also records the position of the predetermined byte value wherever it is found within a register. Because the position of the predetermined byte value is known, there is only one string of bytes that needs to be checked at any given time for a match with the predetermined sequence of byte values.

Another aspect of the invention comprises multi-level comma detection and alignment circuits that can perform, for example, the previously described inventive methods.

BRIEF DESCRIPTION OF THE DRAWINGS

The present invention is illustrated by way of example, and not by way of limitation, in the following figures.

DETAILED DESCRIPTION OF THE DRAWINGS

The present invention is applicable to a variety of communications standards and protocols. The invention has been found to be particularly applicable and beneficial for use with the SONET standard, and this standard is used in the present specification and drawings as an exemplary application for the invention. However, the present invention is not limited to use with the SONET standard.

As is true of many other communications standards, a SONET data stream includes a number of data "packets" (e.g., bytes or words) strung end-to-end to create a continuous serial data stream. To retrieve the data from the data stream, it is necessary to determine where in the data stream one packet ends and the next packet begins. For example, if the data stream includes a long series of 8-bit bytes, the break point (or "comma") between successive bytes must be determined. Clearly, in this example there are eight possible alignments between the data stream and the comma. Without information as to the position of the comma, it would be impossible to extract the data from the data stream. This information is typically included in the data stream itself. For example, a known method of dealing with this requirement is to include near the beginning of the data stream a predetermined series of bits that can be used to locate the comma. Once the predetermined series of bits is recognized within the data stream, the comma location is assumed to be at the beginning and the end of the predetermined series of bits.

Figure 1:
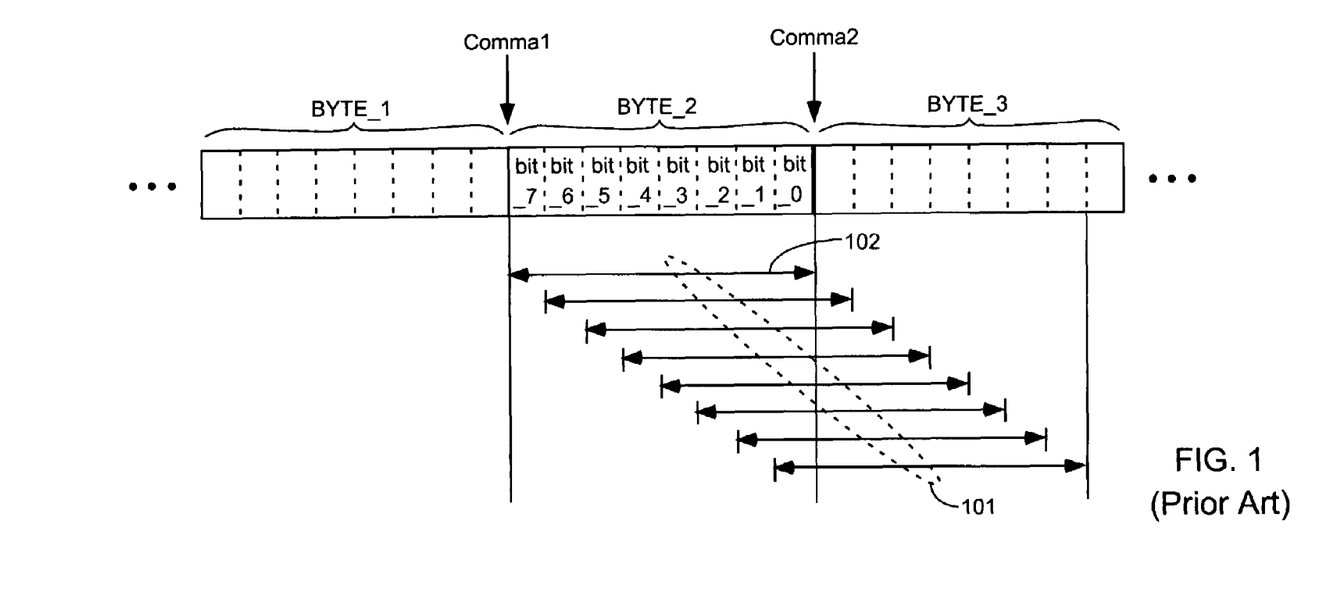
FIG. 1 illustrates how a comma can be located within a continuous, unaligned data stream using known methods.

FIG. 1 illustrates a known method by which a comma can be located within a continuous, unaligned data stream. Note that in FIG. 1 and the other figures herein, the data received first is illustrated towards the right side of the figure. In other words, data is written first to the 8-bit register at the left (BYTE_1), from which it is moved to the right to the next register (BYTE_2), then on to the rightmost register (BYTE_3). Because the data is received as a serial data stream, the received data is arbitrarily divided into 8-bit bytes (e.g., by a serial transceiver) and loaded in parallel into register BYTE_1, then into register BYTE_2, and then into register BYTE_3. Thus, the data in register BYTE_3 was received before the data in register BYTE_2, which was followed by the data in register BYTE_1. The set of registers BYTE_1-BYTE_3 is collectively known as a pipeline register or a pipe register.

To locate the predetermined sequence of eight bits that defines the comma position, eight compare operations are performed for each 8 bits of incoming data, as shown in FIG. 1. Eight arrows 101 illustrate the eight comparisons performed for each eight data bits. In the illustrated example, the predetermined sequence of bits runs from bit_0 to bit_7, and is located in the BYTE_2 register. Therefore, the comparison indicated by arrow 102 will detect a match with the predetermined sequence of bits, and the two commas Comma1 and Comma2 are located after bit bit_7 and before bit bit_0, respectively.

Figure 2:
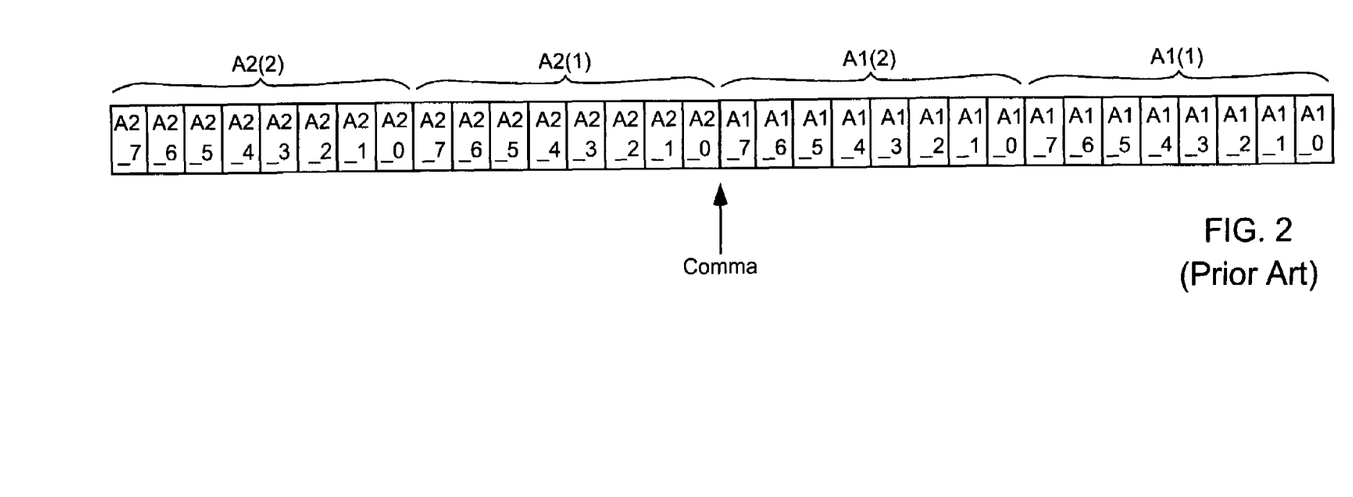
FIG. 2 illustrates an alignment sequence according to the well-known SONET communications standard.

According to the SONET communications standard, a SONET data "packet" includes 32 bits, as shown in FIG. 2. The predetermined sequence of 32 bits includes two repetitions A1(1), A1(2) of a first 8-bit byte value "A1" (A1_0 through A1_7 in FIG. 2), followed by two repetitions A2(1), A2(2) of a second 8-bit byte value "A2", (A2_0 through A2_7 in FIG. 2). Thus, a SONET data stream typically includes a number of A1 bytes (e.g., two or more) followed by a number of A2 bytes. The values of A1 and A2 are determined by the user. The comma is located between the last A1 byte and the first A2 byte, as shown in FIG. 2.

Figure 3:
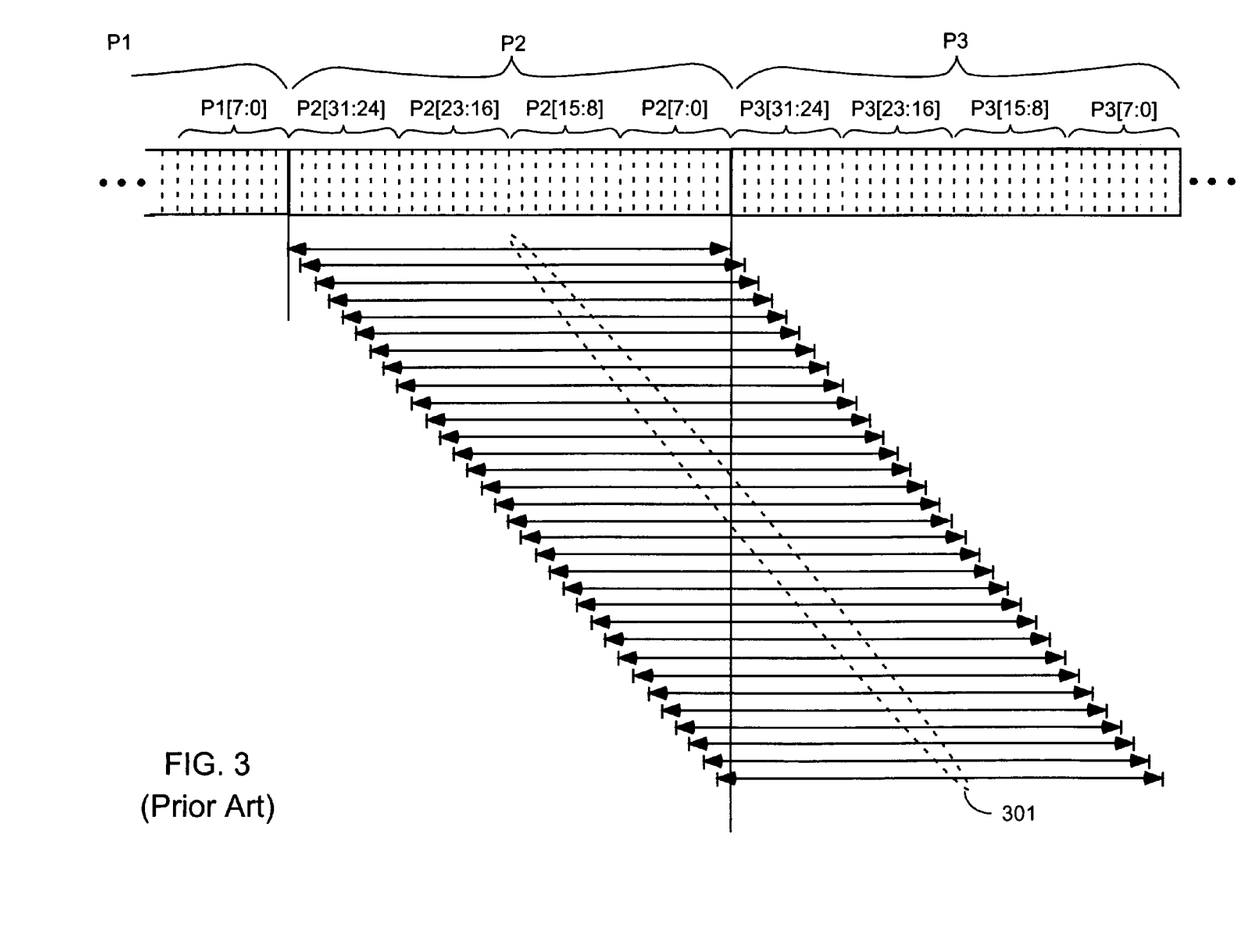
FIG. 3 illustrates a known method of locating a comma within a data stream conforming with the SONET standard.

FIG. 3 illustrates a known method of locating a comma within a data stream conforming with the SONET standard. This method is essentially the same as that shown in FIG. 1, except that each compare operation is extended from eight to 32 bits. In other words, 32 32-bit comparisons are performed, as indicated by the arrows 301. Each of the 32-bit sequences is compared to the sequence A1_A1_A2_A2. The incoming data is stored in a pipeline register, which is illustrated as three consecutive 32-bit registers P1, P2, and P3. Note that the received data stream in FIG. 3 consists of the following series of bytes, in order of receipt: P3[7:0], P3[15:8], P3[23:16], P3[31:24], P2[7:0], P2[15:8], P2[23:16], P2[31:24], P1[7:0].

However, implementing in an integrated circuit the method illustrated in FIG. 3 requires a large amount of circuitry, as 32 32-bit comparisons are being performed simultaneously. The present invention presents an alternative approach, in which a multi-level detection and alignment procedure is used to reduce the amount of logic required to implement the function. Briefly, in the SONET example, first the A2 byte is detected, and the incoming, unaligned data stream is aligned with the A2 byte, producing a partially aligned data stream. Then the A1_A1_A2_A2 byte sequence is detected in the partially aligned data stream, and the partially aligned data stream is re-aligned to place the comma at the A1_A2 boundary, producing a fully aligned data stream.

Figure 4:
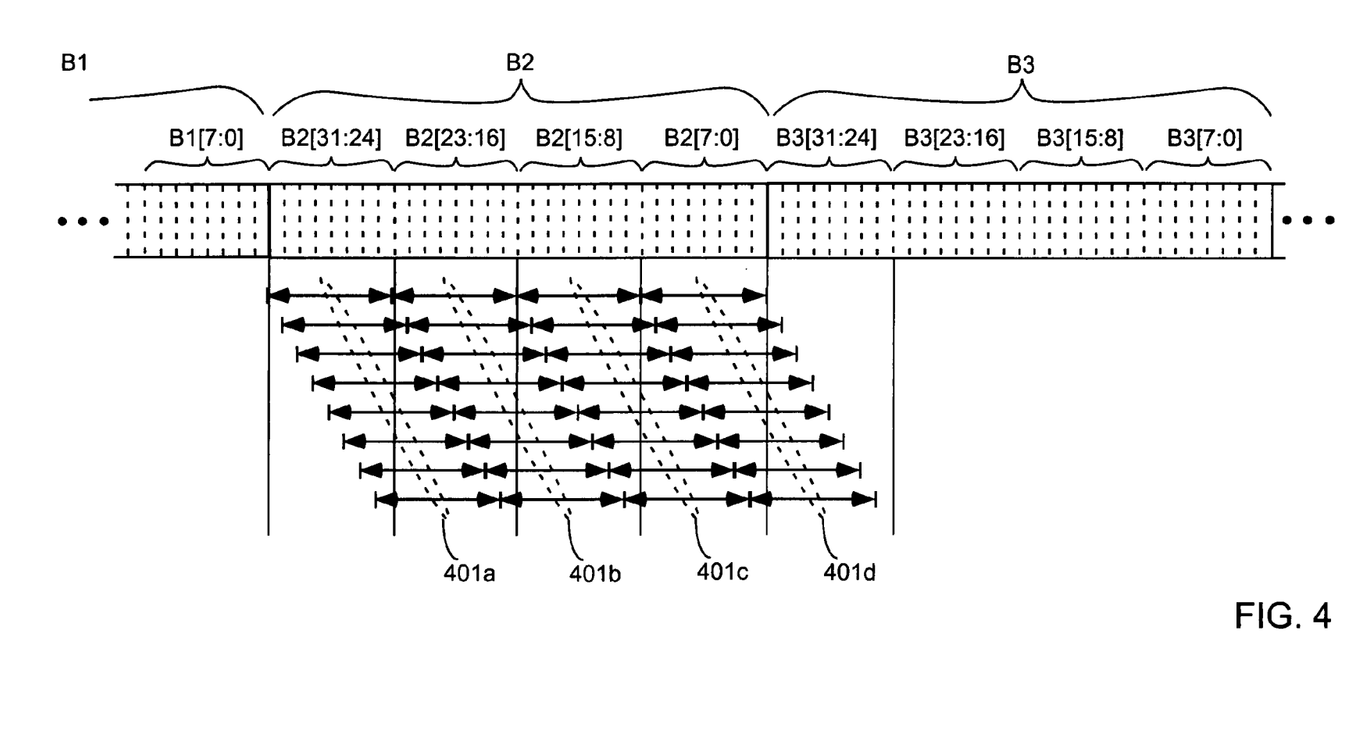
FIG. 4 illustrates how a first-level comma detection procedure can be performed on a SONET data stream.

FIG. 4 illustrates a first-level comma detection procedure for a SONET data stream, according to one embodiment of the present invention. Instead of performing 32 32-bit comparisons, as shown in FIG. 3, 32 8-bit comparisons are performed. Arrows 401a-401d indicate the portions of the pipeline register B1-B3 that are compared with the A2 value, according to the pictured embodiment.

Note that in other embodiments with the same number of bits per byte and the same number of bytes per predetermined sequence of byte values (e.g., other embodiments compatible with SONET), other 8-bit comparisons can be performed. The locations of the bit sequences selected for comparison is a matter of design choice. For example, looking at FIG. 4, comparisons could be performed on bytes extending into register B1 instead of or in addition to register B3. In embodiments having different numbers of bits per byte (e.g., embodiments not compatible with SONET), other byte-wide comparisons can be performed.

Once the A2 value has been located within the unaligned data stream, the data is shifted by the appropriate number of bits to align the data with the preceding and following edges of the A2 value. The shifting step is not illustrated in FIG. 4, but is described below in conjunction with FIG. 9 and Table 2. The data stream resulting from this first shift is referred to herein as a "partially aligned data stream".

Figure 5:
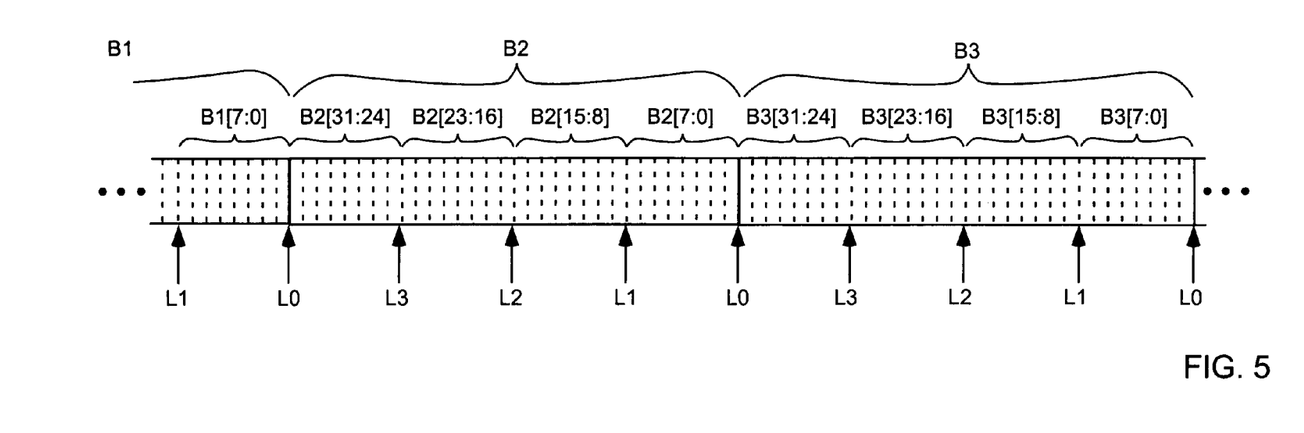
FIG. 5 shows the possible locations of a comma within a SONET data stream after performing a first-level comma detection and alignment.

Once the data stream has been aligned with the byte A2, the number of possible locations for the A1_A2 transition within the B2 register is reduced to four, as shown in FIG. 5. The four possible locations are L0, L1, L2, and L3, i.e., at each byte boundary.

Figure 6:
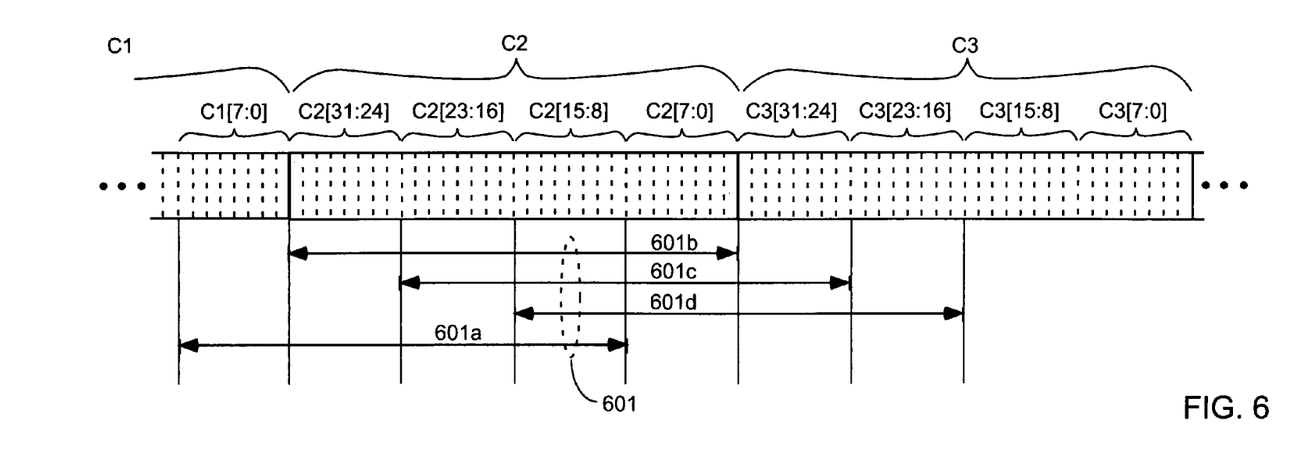
FIG. 6 illustrates how a second-level comma detection procedure can be performed on a partially aligned data stream.

The next step is to discover which of these locations L0-L3 indicates the comma in the A1_A1_A2_A2 byte sequence. FIG. 6 illustrates four exemplary 32-bit comparisons (indicated by arrows 601) that can be performed to determine which of the four possible locations is actually the comma for this predetermined sequence of byte values. Note that in the embodiment shown in FIG. 6, one of the 4-byte sequences compared to the value A1_A1_A2_A2 extends from register C2 into register C1 (arrow 601a), while two of the byte sequences extend from register C2 into register C3 (arrows 601c-601d). The locations of the byte sequences selected for comparison is a matter of design choice. The byte sequences selected for comparison could, for example, include only data from registers C3 and C2, or only data from registers C2 and C1. Further, in embodiments having different numbers of bytes per predetermined sequence of byte values (e.g., embodiments not compatible with SONET), other comparisons can be performed.

In some embodiments, only one 32-bit comparison need be performed at any given time, even further reducing the amount of logic required to implement the circuit. In these embodiments, when the A2 value is located within the 32-bit B2 register, the location is recorded, e.g., by storing the location of any A2 values in a register. Because the B2 register includes four bytes, there are four possible locations in which the A2 byte can occur. SONET data streams include a string of A1 values followed by a string of A2 values. Therefore, a one can be used, for example, to indicate an A2 value, and a zero can be used to indicate any value other than A2, and the ones and zeros can be stored in a 4-bit register. Since the locations of all A2 values are known, only one 32-bit comparison with the A1_A1_A2_A2 value (i.e., only one of the comparisons indicated by arrows 601a-601d) need be made.

Once the A1_A1_A2_A2 sequence has been located within the partially aligned data stream, the data is shifted by the appropriate number of bytes to align the data with the A1_A2 transition, i.e., with the center point of the A1_A1_A2_A2 sequence. The shifting step is not illustrated in FIG. 6, but is described below in conjunction with FIG. 10 and Table 4. The data stream resulting from this second shift is referred to herein as an "aligned data stream" or a "fully aligned data stream".

Note that while the SONET communications standard specifies a comma location at the center point of the predetermined sequence of byte values, other standards might specify other locations, e.g., at the beginning and the end of the sequence. This and other variations are easily accommodated by the methods and circuits of the present invention, as will be clear to those of skill in the relevant arts.

Figure 7:
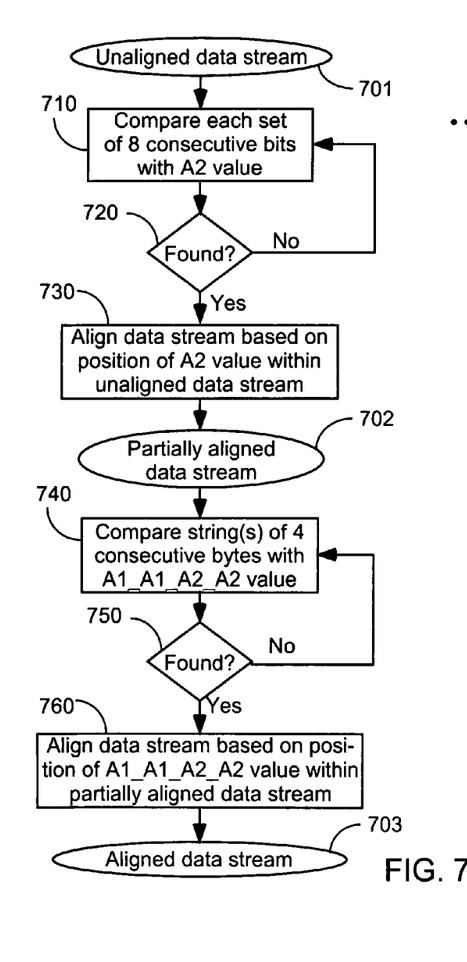
FIG. 7 shows the steps of a method of performing a multi-level comma detection and alignment on an unaligned data stream, e.g., utilizing the techniques illustrated in FIGS. 4-6.

FIG. 7 shows the steps of a method of performing a multi-level comma detection and alignment on an unaligned data stream, e.g., utilizing the techniques described above in conjunction with FIGS. 4-6. To preserve compatibility with the other figures herein, the method is described in terms of the SONET communications standard, with 8-bit words and a 4-byte recognition sequence. However, the invention is not so limited.

In step 710, each set of eight consecutive bits in the unaligned data stream 701 is compared with the predetermined A2 value, until the A2 value is found at decision step 720. (In a more general embodiment, each set of N consecutive bits is compared with a predetermined byte value also having N bits, where N is an integer.) In step 730, once the A2 value is found the data stream is aligned based on the position of the A2 value within the unaligned data stream. This step produces a partially aligned data stream 702.

Figure 8A:
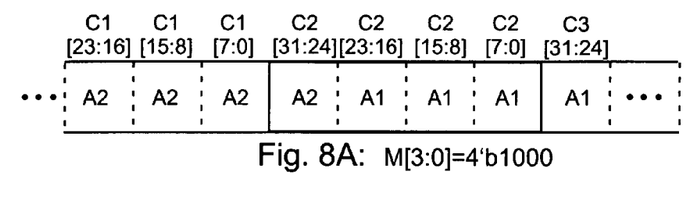
FIGS. 8A-8D illustrate various byte locations that can occur partway through the method of FIG. 7.
Figure 8B:
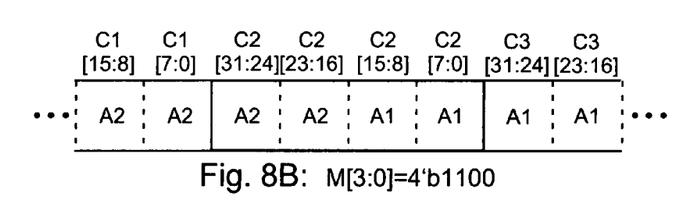
Figure 8C:
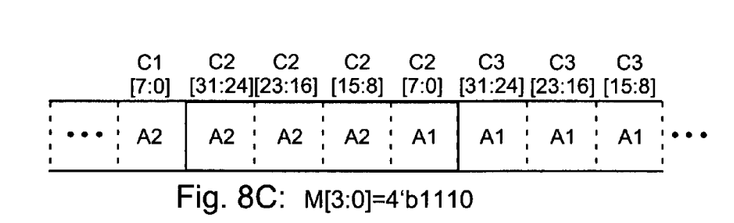
Figure 8D:
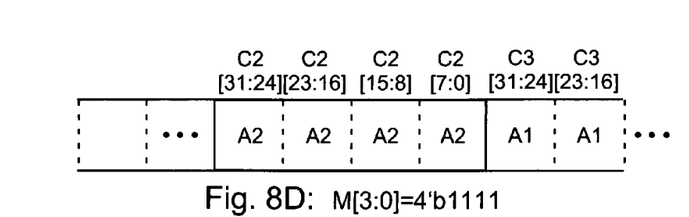

FIGS. 8A-8D illustrate various byte locations that can occur within the partially aligned data stream. For example, suppose that the A2 byte value is detected and the data stream is aligned along the A2 byte boundary. Under these conditions, FIGS. 8A-8D illustrate four possible locations of the A1_A2 boundary within a register C2. In other words, if it is known that the register C2 contains at least one A2 byte value, the position of the A1_A2 byte boundary can be between C2[24] and C2[23], as shown in FIG. 8A; between C2[16] and C2[15], as shown in FIG. 8B; between C2[8] and C2[7], as shown in FIG. 8C; or between C2[0] and C3[31], as shown in FIG. 8D. To distinguish between these four conditions, four match signals M[3:0] can be used, where each bit of M[3:0] corresponds to one of the four bytes in register C2. When the partially aligned data stream includes a sequence of A1 values followed by a sequence of A2 values, and the A1_A2 transition falls within register C2, the four possible values for match signals M[3:0] are 4'b1000 (FIG. 8A), 4'b1100 (FIG. 8B), 4'b1110 (FIG. 8C), and 4'b1111 (FIG. 8D). (The notation 4 'bxxxx denotes a four-bit binary value.)

Note that in the case of FIG. 8D, the entire register C2 is filled with bytes having the A2 value. When this situation occurs, one cannot assume that the comma is located at the rightmost end point of register C2, as shown in FIG. 8D, because the A1_A2 transition might be (for example) somewhere in the C3 register. Therefore, even given the locations of the A2 bytes in the C2 register, an additional comparison must be performed to check for the A1_A1_A2_A2 sequence. Clearly, another reason for always performing the 32-bit comparison is that the A2 value can occur in other locations in the data stream, e.g., somewhere in the middle of the user data. Performing a 32-bit comparison reduces the chances of a false realignment on the user data.

Returning to FIG. 7, in step 740 one or more strings of four consecutive bytes are compared with the A1_A1_A2_A2 value, until this value is found at decision step 750. (In a more general embodiment, one or more strings of Q consecutive bytes are compared with a predetermined sequence of byte values, where Q is an integer.)

As described above in conjunction with FIG. 6, in some embodiments each consecutive string of four bytes is compared with the A1_A1_A2_A2 value. Therefore, four 32-bit comparisons are performed at one time. In other embodiments, the location of the potential A1_A2 transition is stored during the 8-bit comparisons (e.g., by storing signals M[3:0] shown in FIGS. 8A-8D), and this stored value is used to reduce the number of required comparisons to one.

In step 760, once the A1_A1_A2_A2 value is found the data stream is aligned based on the position of the A1_A1_A2_A2 value within the partially aligned data stream. This step produces a fully aligned data stream 703.

Figure 9:
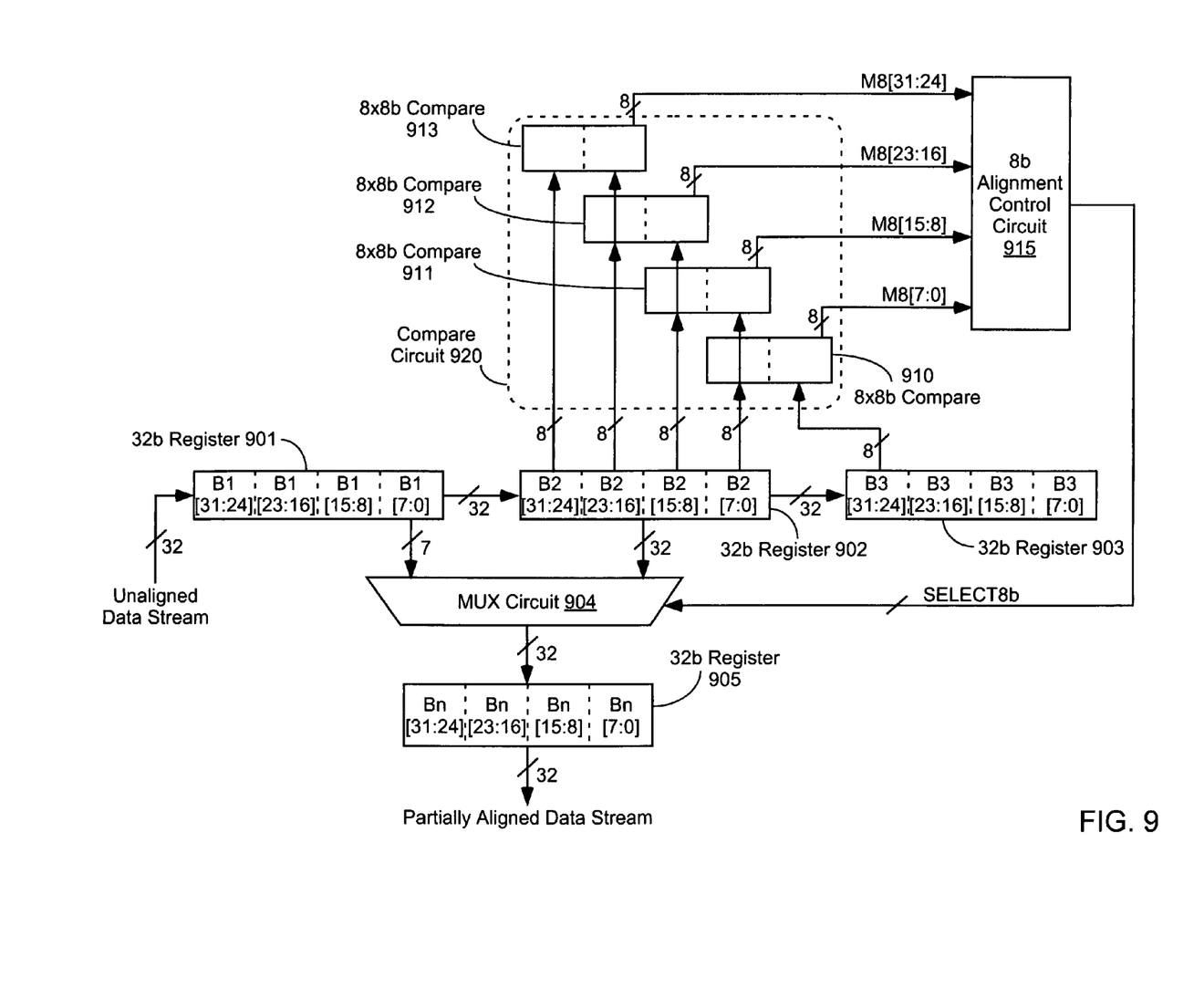
FIG. 9 schematically illustrates a first portion of a multi-level comma detection and alignment circuit that can be used, for example, to implement a first portion of the method of FIG. 7.

FIG. 9 schematically illustrates a first portion of an exemplary multi-level comma detection and alignment circuit that can be used, for example, to implement the method of FIG. 7. The portion of the circuit shown in FIG. 9 can be used, for example, to perform steps 710-730 of FIG. 7.

The circuit of FIG. 9 includes a pipeline register including three 32-bit registers 901-903, a compare circuit 920 that includes elements 910-913, an 8-bit alignment control circuit 915, a multiplexer (MUX) circuit 904, and a 32-bit register 905 that stores the partially aligned data. As will be described in conjunction with FIG. 10, register 905 is optional. Additionally, it will be clear to those of skill in the art that portions of the pipeline register can also be omitted, e.g., bits B[23:0] of the pipeline register are unused and can be removed to reduce the amount of logic in the circuit. However, for simplicity, the entire 32-bit register is shown in FIG. 9.

The circuit of FIG. 9 operates as follows. The receive data stream (which is originally received in a serial form) has already been placed into parallel format, e.g., by a serial transceiver. The data is loaded into register 901 as a 32-bit wide data word, and subsequently into register 902, then into register 903. The compare circuit 920 comprising elements 910-913 performs 32 8-bit comparisons to the value A2, e.g., as shown in FIG. 4. In one embodiment, compare circuit 913 performs the eight 8-bit comparisons indicated by arrows 401a in FIG. 4. Compare circuit 912 performs the eight 8-bit comparisons indicated by arrows 401b, compare circuit 911 performs the eight 8-bit comparisons indicated by arrows 401c, and compare circuit 910 performs the eight 8-bit comparisons indicated by arrows 401d. The 32 comparisons produce 32 output signals M8[31:0] indicating all locations at which a match has been detected.

Table 1 shows one implementation of the compare circuit of FIG. 9, in which the circuit is implemented in Verilog code. The code and the comments in Table 1 (comments are denoted by an initial "//" string) are sufficient to explain to those of skill in the art how the circuit is implemented. The "commaDetect[31:0]" values correspond to the M8[31:0] values in FIG. 9. "Select8b_reg" is a register in which a value is stored that indicates the location of the 8-bit comma within each byte. This information is used to align the data with the A2 byte boundary.

The 4-bit "match8b[3:0]" signals are generated from the commaDetect[31:0] signals, and indicate in which of the four bytes of register B2 an A2 byte value was detected. In some embodiments, this information is used later during the search for the A1_A1_A2_A2 byte sequence to reduce the number of 32-bit comparisons that must be performed, as described below in conjunction with Table 3.

Returning now to FIG. 9, when an 8-bit match is detected, 8-bit alignment control circuit 915 controls multiplexer circuit 904 to shift the unaligned data stream by the correct amount needed to align the data with the A2 byte boundary. Table 2 shows one implementation of alignment control circuit 915 and multiplexer circuit 904, in which the circuits are implemented in Verilog code. The code and the comments in Table 2 are sufficient to explain to those of skill in the art how the circuit is implemented. If a match was detected (i.e., if at least one of signals match8*b*[3:0] is one), the value stored in register select8*b*_reg is used to generate the partially aligned data, shifted by the appropriate number of bits. If no match was detected, then a previously determined alignment is used. This previously determined alignment is obtained by storing the value of select8*b*_reg in another register "stored_select8*b*_reg" each time a match is detected. If no match was detected, the value stored in register stored_select8*b*_reg does not change.

TABLE 1

Verilog Code for 8-bit Match Detect Logic

```
// Incoming data stream is unaligned.
// Make 32 8-bit comparisons, looking for the A2 byte.
// Select the data to search.
wire [7:0] commaSearch31 = B2[31:24];
wire [7:0] commaSearch30 = B2[30:23];
wire [7:0] commaSearch29 = B2[29:22];
wire [7:0] commaSearch28 = B2[28:21];
wire [7:0] commaSearch27 = B2[27:20];
wire [7:0] commaSearch26 = B2[26:19];
wire [7:0] commaSearch25 = B2[25:18];
wire [7:0] commaSearch24 = B2[24:17];
wire [7:0] commaSearch23 = B2[23:16];
wire [7:0] commaSearch22 = B2[22:15];
wire [7:0] commaSearch21 = B2[21:14];
wire [7:0] commaSearch20 = B2[20:13];
wire [7:0] commaSearch19 = B2[19:12];
wire [7:0] commaSearch18 = B2[18:11];
wire [7:0] commaSearch17 = B2[17:10];
wire [7:0] commaSearch16 = B2[16:9];
wire [7:0] commaSearch15 = B2[15:8];
wire [7:0] commaSearch14 = B2[14:7];
wire [7:0] commaSearch13 = B2[13:6];
wire [7:0] commaSearch12 = B2[12:5];
wire [7:0] commaSearch11 = B2[11:4];
wire [7:0] commaSearch10 = B2[10:3];
wire [7:0] commaSearch9 = B2[9:2];
wire [7:0] commaSearch8 = B2[8:1];
wire [7:0] commaSearch7 = B2[7:0];
wire [7:0] commaSearch6 ={B2[6:0], B3[31]};
wire [7:0] commaSearch5 ={B2[5:0], B3[31:30]};
wire [7:0] commaSearch4 ={B2[4:0], B3[31:29]};
wire [7:0] commaSearch3 ={B2[3:0], B3[31:28]};
wire [7:0] commaSearch2 ={B2[2:0], B3[31:27]};
wire [7:0] commaSearch1 ={B2[1:0], B3[31:26]};
wire [7:0] commaSearch0 ={B2[0], B3[31:25]};
// Compare the data at each of the 32 locations.
// Note the mask, which can be used mask out some bits,
//    which are then assumed to be the same as the
//    corresponding bits in A2. In the mask, "1" means
//    compare, "0" means don't compare (i.e., "0" forces a
//    match on the corresponding bits).
// Each compare is done using the following computation:
//    commaDetect =
//        NOT(bitwise_OR((commaSearch XOR A2) AND mask))
wire commaDetect31 = ~ (|((commaSearch31 ^A2) & mask));
wire commaDetect30 = ~ (|((commaSearch30 ^A2) & mask));
wire commaDetect29 = ~ (|((commaSearch29 ^A2) & mask));
wire commaDetect28 = ~ (|((commaSearch28 ^A2) & mask));
wire commaDetect27 = ~ (|((commaSearch27 ^A2) & mask));
wire commaDetect26 = ~ (|((commaSearch26 ^A2) & mask));
wire commaDetect25 = ~ (|((commaSearch25 ^A2) & mask));
wire commaDetect24 = ~ (|((commaSearch24 ^A2) & mask));
wire commaDetect23 = ~ (|((commaSearch23 ^A2) & mask));
wire commaDetect22 = ~ (|((commaSearch22 ^A2) & mask));
wire commaDetect21 = ~ (|((commaSearch21 ^A2) & mask));
wire commaDetect20 = ~ (|((commaSearch20 ^A2) & mask));
wire commaDetect19 = ~ (|((commaSearch19 ^A2) & mask));
wire commaDetect18 = ~ (|((commaSearch18 ^A2) & mask));
```

TABLE 1-continued

Verilog Code for 8-bit Match Detect Logic

```
wire commaDetect17 = ~ (|((commaSearch17 ^A2) & mask));
wire commaDetect16 = ~ (|((commaSearch16 ^A2) & mask));
wire commaDetect15 = ~ (|((commaSearch15 ^A2) & mask));
wire commaDetect14 = ~ (|((commaSearch14 ^A2) & mask));
wire commaDetect13 = ~ (|((commaSearch13 ^A2) & mask));
wire commaDetect12 = ~ (|((commaSearch12 ^A2) & mask));
wire commaDetect11 = ~ (|((commaSearch11 ^A2) & mask));
wire commaDetect10 = ~ (|((commaSearch10 ^A2) & mask));
wire commaDetect9 = ~ (|((commaSearch9 ^A2) & mask));
wire commaDetect8 = ~ (|((commaSearch8 ^A2) & mask));
wire commaDetect7 = ~ (|((commaSearch7 ^A2) & mask));
wire commaDetect6 = ~ (|((commaSearch6 ^A2) & mask));
wire commaDetect5 = ~ (|((commaSearch5 ^A2) & mask));
wire commaDetect4 = ~ (|((commaSearch4 ^A2) & mask));
wire commaDetect3 = ~ (|((commaSearch3 ^A2) & mask));
wire commaDetect2 = ~ (|((commaSearch2 ^A2) & mask));
wire commaDetect1 = ~ (|((commaSearch1 ^A2) & mask));
wire commaDetect0 = ~ (|((commaSearch0 ^A2) & mask));
// "Match8b" is a 4-bit value that indicates in which
//    of the four bytes an A2 byte was detected.
// Generate values for match8b.
match8b[0] =   commaDetect0 | commaDetect1 | commaDetect2 |
               commaDetect3 | commaDetect4 | commaDetect5 |
               commaDetect6 | commaDetect7;
match8b[1] =   commaDetect8 | commaDetect9 | commaDetect10 |
               commaDetect11 | commaDetect12 | commaDetect13 |
               commaDetect14 | commaDetect15;
match8b[2] =   commaDetect16 | commaDetect17 | commaDetect18 |
               commaDetect19 | commaDetect20 | commaDetect21 |
               commaDetect22 | commaDetect23;
match8b[3] =   commaDetect24 | commaDetect25 | commaDetect26 |
               commaDetect27 | commaDetect28 | commaDetect29 |
               commaDetect30 | commaDetect31;
// "Select8b_reg" is an 8-bit register that indicates the
//    location of the 8-bit comma within each byte.
// Generate values for select8b_reg.
// "x" is a don't-care state.
// It doesn't matter which 8 bits matched, just align
//    to one of the bytes.
if (match8b[3]) begin
    case
    {commaDetect31,commaDetect30,commaDetect29,commaDetect28,
    commaDetect27,commaDetect26,commaDetect25,commaDetect24}
        8'b1xxxxxxx:   select8b_reg = 8'b10000000;
        8'b01xxxxxx:   select8b_reg = 8'b01000000;
        8'b001xxxxx:   select8b_reg = 8'b00100000;
        8'b0001xxxx:   select8b_reg = 8'b00010000;
        8'b00001xxx:   select8b_reg = 8'b00001000;
        8'b000001xx:   select8b_reg = 8'b00000100;
        8'b0000001x:   select8b_reg = 8'b00000010;
        8'b00000001:   select8b_reg = 8'b00000001;
        default:       select8b_reg = 8'b00000001;
    end
end
else if (match8b[2]) begin
    case
    {commaDetect23,commaDetect22,commaDetect21,commaDetect20,
    commaDetect19,commaDetect18,commaDetect17,commaDetect16}
        8'b1xxxxxxx:   select8b_reg = 8'b10000000;
        8'b01xxxxxx:   select8b_reg = 8'b01000000;
        8'b001xxxxx:   select8b_reg = 8'b00100000;
        8'b0001xxxx:   select8b_reg = 8'b00010000;
        8'b00001xxx:   select8b_reg = 8'b00001000;
        8'b000001xx:   select8b_reg = 8'b00000100;
        8'b0000001x:   select8b_reg = 8'b00000010;
        8'b00000001:   select8b_reg = 8'b00000001;
        default:       select8b_reg = 8'b00000001;
    end
end
else if (match8b[1]) begin
    case
    {commaDetect15,commaDetect14,commaDetect13,commaDetect12,
    commaDetect11,commaDetect10,commaDetect9,commaDetect8}
        8'b1xxxxxxx:   select8b_reg =8'b10000000;
        8'b01xxxxxx:   select8b_reg =8'b01000000;
        8'b001xxxxx:   select8b_reg =8'b00100000;
        8'b0001xxxx:   select8b_reg =8'b00010000;
```

TABLE 1-continued

Verilog Code for 8-bit Match Detect Logic

```
        8'b00001xxx:   select8b_reg =8'b00001000;
        8'b000001xx:   select8b_reg =8'b00000100;
        8'b0000001x:   select8b_reg =8'b00000010;
        8'b00000001:   select8b_reg =8'b00000001;
        default:       select8b_reg =8'b00000001;
      end
  end
  else if (match8b[0]) begin
    case {commaDetect7,commaDetect6,commaDetect5,commaDetect4,
      commaDetect3,commaDetect2,commaDetect1,commaDetect0}
        8'b1xxxxxxx:   select8b_reg =8'b10000000;
        8'b01xxxxxx:   select8b_reg =8'b01000000;
        8'b001xxxxx:   select8b_reg =8'b00100000;
        8'b0001xxxx:   select8b_reg =8'b00010000;
        8'b00001xxx:   select8b_reg =8'b00001000;
        8'b000001xx:   select8b_reg =8'b00000100;
        8'b0000001x:   select8b_reg =8'b00000010;
        8'b00000001:   select8b_reg =8'b00000001;
        default:       select8b_reg =8'b00000001;
    end
  end
```

TABLE 2

Verilog Code for 8-bit Alignment Control and MUX
// Generate the partially aligned data stream.
// If an 8-bit match to A2 was detected, align the data to
//    the A2 boundary.
// If no 8-bit match was detected, use the previous
//    alignment.
```
begin
  if (match8b)                      // an 8-bit match was detected
    case (select8b_reg)
      8'b10000000:   part_aligned_data =
                         B2 [31: 0]
      8'b01000000:   part_aligned_data =
                         {B1[0], B2[31:1]};
      8'b00100000:   part_aligned_data =
                         {B1[1:0], B2[31:2]};
      8'b00010000:   part_aligned_data =
                         {B1[2:0], B2[31:3]};
      8'b00001000:   part_aligned_data =
                         {B1[3:0], B2[31:4]};
      8'b00000100:   part_aligned_data =
                         {B1[4:0], B2[31:5]};
      8'b00000010:   part_aligned_data =
                         {B1[5:0], B2[31:6]};
      8'b00000001:   part_aligned_data =
                         {B1[6:0], B2[31:7]};
      default:       part_aligned_data = B2[31:0];
    endcase // case(select8b_reg)
  else                              // no match was detected
    case (stored_select8b_reg)
      8'b10000000:   part_aligned_data =
                         B2 [31:0];
      8'b01000000:   part_aligned_data =
                         {B1[0], B2[31:1]};
      8'b00100000:   part_aligned_data =
                         {B1[1:0], B2[31:2]};
      8'b00010000:   part_aligned_data =
                         {B1[2:0], B2[31:3]};
      8'b00001000:   part_aligned_data =
                         {B1[3:0], B2[31:4]};
      8'b00000100:   part_aligned_data =
                         {B1[4:0], B2[31:5]};
      8'b00000010:   part_aligned_data =
                         {B1[5:0], B2[31:6]};
      8'b00000001:   part_aligned_data =
                         {B1[6:0], B2[31:7]};
      default:       part_aligned_data B2[31:0];
    endcase // case(stored_select8b_reg)
end
// If there was a match, then save the 8-bit alignment.
// The saved alignment will be used until the next match is
```

TABLE 2-continued

Verilog Code for 8-bit Alignment Control and MUX
//    detected. Otherwise, reload the same alignment value.
```
begin
  if (match8b)
    stored_select8b_next = select8b_reg;
  else
    stored_select8b_next = stored_select8b_reg
end
```

Figure 10:
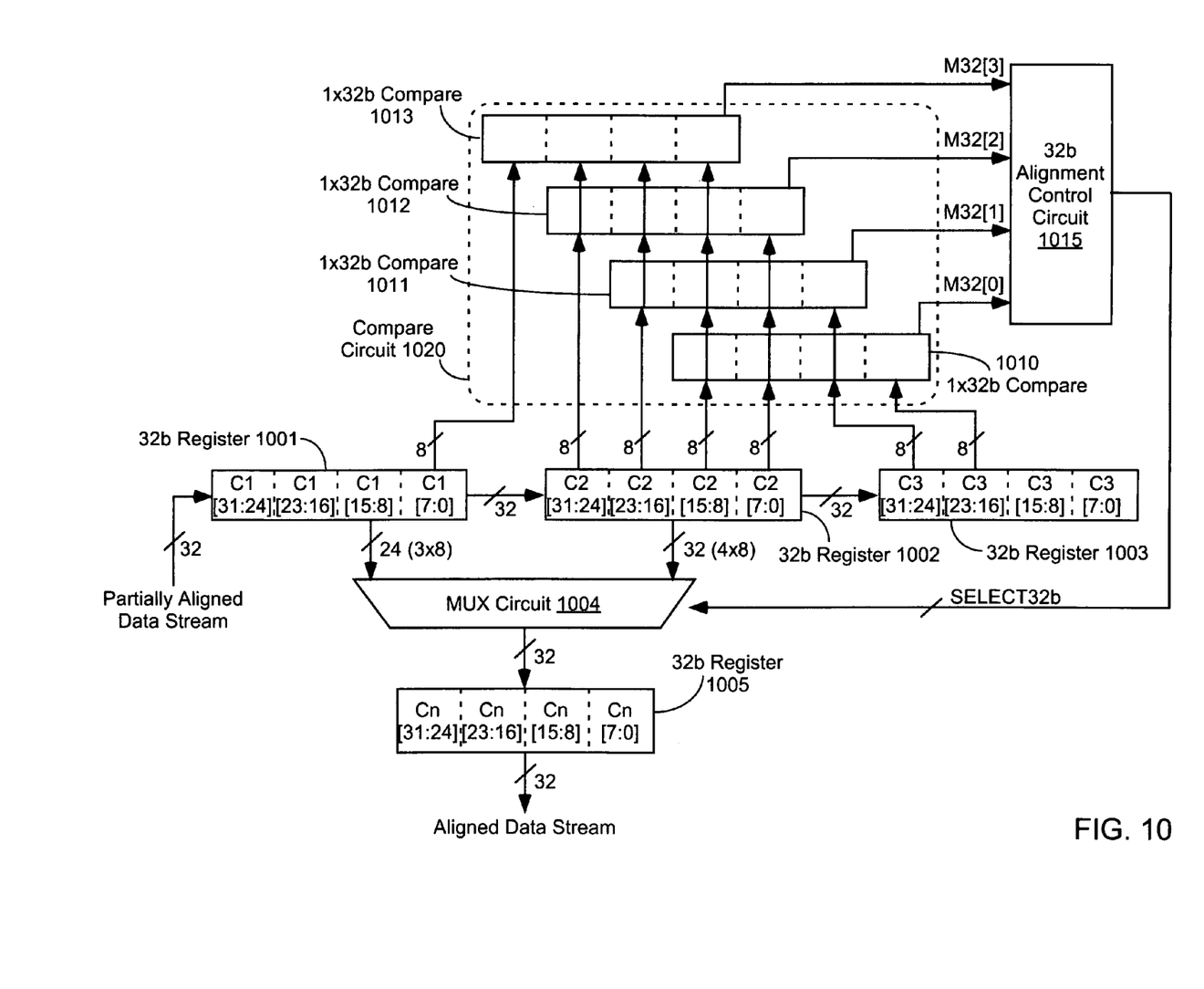
FIG. 10 schematically illustrates a second portion of a multi-level comma detection and alignment circuit that can be used, for example, to implement a second portion of the method of FIG. 7.

FIG. 10 schematically illustrates a second portion of the exemplary circuit partially illustrated in FIG. 9. The portion of the circuit shown in FIG. 10 can be used, for example, to perform steps 740-760 of FIG. 7.

The circuit of FIG. 10 includes a second pipeline register that includes three 32-bit registers 1001-1003, a compare circuit 1020 that includes elements 1010-1013, a 32-bit alignment control circuit 1015, a second multiplexer (MUX) circuit 1004, and a 32-bit register 1005 that stores the fully aligned data. As previously mentioned in conjunction with FIG. 9, register 905 can be omitted, and the data from multiplexer circuit 904 can be loaded directly into register 1001 of FIG. 10. Additionally, it will be clear to those of skill in the art that portions of the second pipeline register can also be omitted, e.g., bits C3[15:0] of the second pipeline register are unused and can be removed to reduce the amount of logic in the circuit. However, for simplicity, the entire 32-bit register is shown in FIG. 10.

The circuit of FIG. 10 operates as follows. The partially aligned data stream is loaded into register 1001 as a 32-bit wide data word, and subsequently into register 1002, then into register 1003. In the pictured embodiment, the compare circuit 1020 comprising elements 1010-1013 performs four 32-bit comparisons to the value A1_A1_A2_A2, e.g., as shown in FIG. 6. In one embodiment, compare circuit 1013 performs the 32-bit comparison indicated by arrow 601a in FIG. 6. Compare circuit 1012 performs the 32-bit comparison indicated by arrow 601b, compare circuit 1011 performs the 32-bit comparison indicated by arrow 601c, and compare circuit 1010 performs the 32-bit comparison indicated by arrow 601d. The four comparisons produce four output signals M32[3:0] indicating all locations at which a match has been detected.

Table 3 shows another implementation of compare circuit 1020, in which the circuit is implemented in Verilog code. The implementation of Table 3 utilizes the "match8b" signals generated in Table 1, which indicate in which of the four bytes of register B2 an A2 byte value was detected. This information reduces the number of comparisons that must be performed to only one. Thus, only one 32-bit comparison need be performed at any given time, reducing the amount of logic required to implement the function.

The code and the comments in Table 3 are sufficient to explain to those of skill in the art how the circuit is implemented.

Returning now to FIG. 10, when a 32-bit match is detected, 32-bit alignment control circuit 1015 controls multiplexer circuit 1004 to shift the partially aligned data stream by the correct amount needed to align the data with the A1_A2 transition. Table 4 shows one implementation of alignment control circuit 1015 and multiplexer circuit 1004, in which the circuits are implemented in Verilog code. The code and the comments in Table 4 are sufficient to explain to those of skill in the art how the circuit is implemented.

If a 32-bit match was detected (i.e., if signal match32b is one), the value stored in register select32b_reg is used to generate the partially aligned data, shifted by the appropriate number of bits. If no match was detected, then a previously determined alignment is used. This previously determined alignment is obtained by storing the value of register select32b_reg in another register "stored_select32b_reg" each time a match is detected. If no match was detected, the value in register stored_select32b_reg does not change.

TABLE 3

Verilog Code for 32-bit Match Detect Logic

```
// Data is now lined up with the byte boundary.
// Find the 32 bits to compare, based on the location of the,
//    A1_A2 transition.
// "Match8b" records the location of the A1_A2 transition
//    within the 32 bit sequence. "1" in a byte location
//    means the byte is A2, "0" means the byte is A1.
case (match8b)
    4'b1000:    compare_data32 =  {C2[15:8], C2[23:16], C2[31:24],
                                   C1[17:0]};   // A1_A1_A1_A2
    4'b1100:    compare_data32 =  {C2[7:0], C2[15:8], C2[23:16],
                                   C2[31:24]};  // A1_A1_A2_A2
    4'b1110:    compare_data32 =  {C3[31:24], C2[7:0], C2[15:8],
                                   C3[23:16]};  // A1_A2_A2_A2
    4'b1111:    compare_data32 =  {C3[23:16], C3[31:24], C2[7:0],
                                   C2[15:8]};   // A2_A2_A2_A2
    default:    compare_data32 =  C2[31:0];
endcase
// perform the 32-bit comparison
begin
    if (compare_data32 == A1_A1_A2_A2)
        match32b = 1'b1;
    else
        match32b = 1'b0;
end
```

TABLE 4

Verilog Code for 32-bit Alignment Control and MUX

```
// Generate the aligned data stream
// If a 32-bit match to A1_A1_A2_A2 was detected, align the
//    data to the A1_A2 boundary.
// If no 32-bit match was detected, use the previous
//    alignment, stored in "stored_select32b_reg".
begin
    if (match32b)                // a 32-bit match was detected
        case (select32b_reg)
            4'b1000:   aligned_data = {Cl[23:0],   C2[31:24]};
                                                // A1_A1_A1_A2
            4'b1100:   aligned_data = {C1[15:0],   C2[31:16]};
                                                // A1_A1_A2_A2
            4'b1110:   aligned_data = {C1[7:0],    C2[31:8]};
                                                // A1_A2_A2_A2
            4'b1111:   aligned_data = C2[31:0];  // A2_A2_A2_A2
            default:   aligned_data = C2[31:0];
        endcase // case(select32b_reg)
    else                         // no match was detected
        case (stored_select32b_reg)
            4'b1000:   aligned_data = {C1[23:0],   C2[31:24]};
                                                // A1_A1_A1_A2
            4'b1100:   aligned_data = {C1[15:0],   C2[31:16]};
                                                // A1_A1_A2_A2
            4'b1110:   aligned_data = {C1[7:0],    C2[31:8]};
                                                // A1_A2_A2_A2
            4'b1111:   aligned_data = C2[31:0];  // A2_A2_A2_A2
            default:   aligned_data = C2[31:0];
        endcase // case(stored_select32b_reg)
end
// If there was a match, then save the 32-bit alignment.
// The saved alignment will be used until the next match is
//    detected.
begin
    if (match32b)
        stored_select32b_next = select32b_reg;
    else
        stored_select32b_next = stored_select32b_reg
end
```

The circuits illustrated in FIGS. 9 and 10 and described in Tables 1-4 are illustrative of exemplary implementations of the present invention. These exemplary implementations search first for an 8-bit byte and then for a predetermined 4-byte sequence. However, many variations on these circuits will be apparent to those of skill in the associated arts. For example, a byte can include 10 bits, or any other number of bits, and a byte sequence can include some number of bytes other than four. Further, while the examples described herein search for a byte sequence of A1_A1_A2_A2, other byte sequences can also be used as the byte sequence comparison value. In some embodiments, for example, the second search involves a comparison with a sequence of bytes different from the exemplary sequence described herein. For example, more than two different byte values can be included in the sequence of bytes. It will be apparent to those skilled in the art after reading this specification that the present invention can be practiced within these and other architectural variations. For example, the above text describes the circuits and methods of the invention in the context of the SONET communications standard. However, the circuits and methods of the invention can also be implemented to conform to other communications standards.

Accordingly, all such modifications and additions are deemed to be within the scope of the invention, which is to be limited only by the appended claims and their equivalents.

What is claimed is:

1. A method of performing multi-level comma detection and alignment on an unaligned data stream, the method comprising:
    receiving the unaligned data stream;
    comparing each N consecutive bits in the unaligned data stream with a predetermined byte value having N bits, where N is an integer;
    aligning, when a first set of N consecutive bits matches the predetermined byte value, the unaligned data stream based on a position of the predetermined byte value within the unaligned data stream to provide a partially aligned data stream;
    comparing Q consecutive data bytes in the partially aligned data stream with a predetermined sequence of byte values, where Q is an integer; and
    aligning, when a first set of Q consecutive bytes matches the predetermined sequence of byte values, the partially aligned data stream based on a position of the first set of Q consecutive bytes within the partially aligned data stream to provide a fully aligned data stream.

2. The method of claim 1, wherein comparing Q consecutive data bytes comprises comparing each Q consecutive data bytes within the partially aligned data stream at least until a first match is found.

3. The method of claim 1, further comprising generating a second value identifying a position of the predetermined byte value within the partially aligned data stream, and wherein comparing Q consecutive data bytes comprises utilizing the second value to identify a comparison to perform that includes the predetermined byte value.

4. The method of claim 1, wherein aligning the unaligned data stream comprises aligning the unaligned data stream with preceding and following edges of the predetermined byte value.

5. The method of claim 4, wherein aligning the partially aligned data stream comprises aligning the partially aligned data stream with a center point of the predetermined sequence of byte values.

6. The method of claim 1, wherein aligning the partially aligned data stream comprises aligning the partially aligned data stream with a center point of the predetermined sequence of byte values.

7. The method of claim 1, wherein N is eight.

8. The method of claim 7, wherein Q is four.

9. The method of claim 1, wherein Q is four.

10. The method of claim 1, wherein:
the unaligned data stream conforms to a SONET communications standard;
the predetermined byte value is A2 as defined by the SONET standard; and
the predetermined sequence of byte values is A1_A1_A2_A2 as defined by the SONET standard.

11. A circuit, comprising:
means for receiving an unaligned data stream;
means for comparing each N consecutive bits in the unaligned data stream with a predetermined byte value having N bits, where N is an integer;
means for aligning, when a first set of N consecutive bits matches the predetermined byte value, the unaligned data stream based on a position of the predetermined byte value within the unaligned data stream to provide a partially aligned data stream;
means for comparing Q consecutive data bytes in the partially aligned data stream with a predetermined sequence of byte values, where Q is an integer; and
means for aligning, when a first set of Q consecutive bytes matches the predetermined sequence of byte values, the partially aligned data stream based on a position of the first set of Q consecutive bytes within the partially aligned data stream to provide a fully aligned data stream.

12. The circuit of claim 11, wherein the means for comparing Q consecutive data bytes comprises means for comparing each Q consecutive data bytes within the partially aligned data stream at least until a first match is found.

13. The circuit of claim 11, further comprising means for generating a second value identifying a position of the predetermined byte value within the partially aligned data stream, and wherein the means for comparing Q consecutive data bytes comprises means for utilizing the second value to identify a comparison to perform that includes the predetermined byte value.

14. The circuit of claim 11, wherein the means for aligning the unaligned data stream comprises means for aligning the unaligned data stream with preceding and following edges of the predetermined byte value.

15. The circuit of claim 14, wherein the means for aligning the partially aligned data stream comprises means for aligning the partially aligned data stream with a center point of the predetermined sequence of byte values.

16. The circuit of claim 11, wherein the means for aligning the partially aligned data stream comprises means for aligning the partially aligned data stream with a center point of the predetermined sequence of byte values.

17. The circuit of claim 11, wherein N is eight.

18. The circuit of claim 17, wherein Q is four.

19. The circuit of claim 11, wherein Q is four.

20. The circuit of claim 11, wherein:
the unaligned data stream conforms to a SONET communications standard;
the predetermined byte value is A2 as defined by the SONET standard; and
the predetermined sequence of byte values is A1_A1_A2_A2 as defined by the SONET standard.

21. A multi-level comma detection and alignment circuit, comprising:
a first pipeline register comprising a first series of byte-wide registers each comprising N bits, the first pipeline register comprising a plurality of data input terminals, M byte-wide output terminals, and a plurality of bit-wide output terminals, wherein N and M are integers;
a first compare circuit having M byte-wide input terminals coupled to the M byte-wide output terminals of the first pipeline register and further having a plurality of output terminals;
a first alignment control circuit having a plurality of input terminals coupled to the output terminals of the first compare circuit and further having a plurality of select output terminals;
a first multiplexer circuit having a plurality of data input terminals coupled to the bit-wide output terminals of the first pipeline register, a plurality of select input terminals coupled to the select output terminals of the first alignment control circuit, and a plurality of output terminals;
a second pipeline register comprising a second series of byte-wide registers each comprising N bits, the second pipeline register comprising a plurality of input terminals coupled to the output terminals of the first multiplexer circuit, P first byte-wide output terminals, and Q second byte-wide output terminals, wherein P and Q are integers;
a second compare circuit having P byte-wide input terminals coupled to the P first byte-wide output terminals of the second pipeline register and further having a plurality of output terminals;
a second alignment control circuit having a plurality of input terminals coupled to the output terminals of the second compare circuit and further having a plurality of select output terminals;
a second multiplexer circuit having Q byte-wide data input terminals coupled to the Q second byte-wide output terminals of the second pipeline register, a plurality of select input terminals coupled to the select output terminals of the second alignment control circuit, and a plurality of output terminals; and
an aligned data stream register having a plurality of input terminals coupled to the output terminals of the second multiplexer circuit and further having a plurality of output terminals.

22. The circuit of claim 21, further comprising:
a partially aligned data stream register having a plurality of input terminals and a plurality of output terminals, the partially aligned data stream register being coupled between the output terminals of the first multiplexer circuit and the input terminals of the second pipeline register.

23. The circuit of claim 21, wherein N is eight.

24. The circuit of claim 23, wherein M is five, P is seven, and Q is four.

25. The circuit of claim 21, wherein M is five.

26. The circuit of claim 21, wherein P is seven.

27. The circuit of claim 21, wherein Q is four.

* * * * *